US012708590B2

(12) United States Patent
Meng

(10) Patent No.: US 12,708,590 B2
(45) Date of Patent: Aug. 18, 2026

(54) INFANT AND TODDLER FEEDER

(71) Applicant: Zhongshan Jvtech Silicone Technology Co., LTD., Zhongshan (CN)

(72) Inventor: Yucheng Meng, Zhongshan (CN)

(73) Assignee: Zhongshan Jvtech Silicone Technology Co., LTD., Zhongshan (CN)

( * ) Notice: Subject to any disclaimer, the term of this patent is extended or adjusted under 35 U.S.C. 154(b) by 152 days.

(21) Appl. No.: 18/741,902

(22) Filed: Jun. 13, 2024

(65) Prior Publication Data

US 2024/0325253 A1 Oct. 3, 2024

(30) Foreign Application Priority Data

Apr. 30, 2024 (CN) ........................ 202410545317.7

(51) Int. Cl.
*A61J 9/00* (2006.01)

(52) U.S. Cl.
CPC ...................................... *A61J 9/00* (2013.01)

(58) Field of Classification Search
CPC .... A61J 17/001; A61J 17/101; A61J 11/0005; A61J 11/005; A61J 7/0046; A61J 11/0053; A61J 9/00; A47G 21/00
USPC .......................................... 215/11.1; 604/77
See application file for complete search history.

(56) References Cited

U.S. PATENT DOCUMENTS

| | | | | |
|---|---|---|---|---|
| 2,899,110 A * | 8/1959 | Parker | B65D 1/0292 297/DIG. 8 |
| 5,843,030 A * | 12/1998 | Van Der Merwe | A61J 7/0053 606/236 |
| 2018/0256454 A1* | 9/2018 | Badger | A61J 17/113 |

FOREIGN PATENT DOCUMENTS

| | | |
|---|---|---|
| CN | 102348447 B | 12/2015 |
| CN | 218187310 U | 1/2023 |

* cited by examiner

*Primary Examiner* — Andrew T Kirsch
(74) *Attorney, Agent, or Firm* — Ming Jiang; OPENPTO US LLC

(57) ABSTRACT

An infant and toddler feeder includes a first main body and a second main body, where the second main body has an opening sealing portion, a piston, and a pushing connection portion; the opening sealing portion is matched with the filling opening for connecting the filling opening and sealing the filling opening; the piston is matched with an inner cavity of the cylindrical temporary storage area to form a connection structure of the piston; and the pushing connection portion is connected between the piston and the opening sealing portion. When the biting and sucking area is empty or has any gap, elastic thrust F provided by the pushing connection portion to the piston will always exert the acting force to the food in the cylindrical temporary storage area towards the biting and sucking area, such that the temporarily stored food automatically enters the biting and sucking area.

13 Claims, 7 Drawing Sheets

INFANT AND TODDLER FEEDER

CROSS REFERENCE TO RELATED APPLICATIONS

This application is based upon and claims foreign priority to Chinese Patent Application No. CN202410545317.7, filed on Apr. 30, 2024, the entire contents of which are incorporated herein by reference.

TECHNICAL FIELD

The present disclosure belongs to the technical field of infant feeders, relates to the technology of realizing automatic pushing of food by the infant feeders, and particularly relates to an infant and toddler feeder.

BACKGROUND

An infant and toddler feeder is a device capable of effectively helping an infant eat smoothly. After food is placed into a mesh bag of the infant and toddler feeder, the baby can repeatedly chew the infant and toddler feeder many times, such that the baby can eat finely masticated food. After the baby starts teething, he/she needs to eat in other ways. However, since chewing and swallowing functions of the baby are not yet fully developed, traditional tools used by his/her parents to feed the baby may pose choking or gaging hazards to the baby. The infant and toddler feeder can properly meet the needs of the baby, allowing him/her to comfortably eat complementary food during the teething period. Daily activities, such as constantly grabbing, sucking, and chewing, can help alleviate teething discomfort and promote oral development of the baby.

However, in the prior art, infant and toddler feeders usually lack structures to assist in pushing the food. As babies chew, food will be pushed away from the feeding opening and accumulate there, thereby affecting eating of the baby.

SUMMARY

In order to solve the above technical problems, the present disclosure provides an infant and toddler feeder.

In order to achieve the above objectives, the present disclosure adopts a technical solution as follows:

an infant and toddler feeder, including:

a first main body; and a second main body;

where the first main body has a food pouch and a filling opening;

the food pouch includes a biting and sucking area and a cylindrical temporary storage area;

the filling opening is disposed at one end of the cylindrical temporary storage area, and the biting and sucking area is disposed at the other end of the cylindrical temporary storage area;

the second main body has an opening sealing portion, a piston, and a pushing connection portion;

the opening sealing portion is matched with the filling opening for connecting the filling opening and sealing the filling opening;

the piston is matched with an inner cavity of the cylindrical temporary storage area to form a connection structure of the piston;

the pushing connection portion is connected between the piston and the opening sealing portion; and the pushing connection portion provides elastic thrust F, such that the piston has a movement trend towards the biting and sucking area.

Preferably, the pushing connection portion is a barrel-shaped thin-walled cone having a first end face and a second end face;

where the barrel-shaped thin-walled cone is elastic;

the first end face is connected to the piston;

the second end face is connected to the opening sealing portion;

an area of the first end face is smaller than that of the second end face; and when the first end face moves towards the second end face under the action of external force, the barrel-shaped thin-walled cone can elastically deform and form a nested structure.

Preferably, the opening sealing portion is an annular structure having an annular outer wall and an annular inner wall;

where the annular outer wall is in interference connection with an inner wall surface of the filling opening; and the second end face is connected to the annular inner wall of the opening sealing portion.

Preferably, the feeder includes:

a piston push rod;

where the piston has a front piston surface, a back piston surface and an annular piston surface;

the front piston surface faces the biting and sucking area;

the back piston surface is the other end face of the piston parallel to the front piston surface;

the annular piston surface is connected to an inner wall of the cylindrical temporary storage area to form a surface connecting with the piston; and the piston push rod is disposed on the back piston surface and extends in an opposite direction of the elastic thrust F.

Preferably, the first end face is connected to a position A of the piston push rod;

the second end face is connected to a position B of the opening sealing portion;

where a distance from the position A to the back piston surface is $L_a$;

a distance from the position B to an upper end face of the opening sealing portion is $L_b$; and the upper end face of the opening sealing portion is an end face of the opening sealing portion facing the biting and sucking area.

$$\text{Preferably, } L_b + m < L_a,\ 2\ \text{mm} \le m \le 10\ \text{mm}.$$

$$\text{Preferably, } 0\ \text{mm} \le L_b \le 3\ \text{mm}.$$

Preferably, thin-walled wall surfaces of the bucket-type thin-walled cone is a continuous surface; and when the first end face and the second end face are in a close state without the action of external force, air-permeable through holes are formed at a crease produced by nesting of the barrel-shaped thin-walled cone, and the air-permeable through holes penetrate through the thin-walled wall surfaces.

Preferably, n air-permeable through holes are evenly distributed on a circumference of the crease; and $$2 \le n \le 4.$$

Preferably, the feeder includes:

an easy-hold handle;

the easy-hold handle is disposed on a lower end face of the opening sealing portion; and the lower end face is another end face of the opening sealing portion parallel to the upper end face thereof.

Preferably, one or more of inner cavity surfaces of the annular piston surface and/or the cylindrical temporary storage area, a sealing surface of the opening sealing portion, and/or an inner cavity surface of the filling opening have:

anti-adhesion surface micro-marks; and the anti-adhesion surface micro-marks are surface texture and/or a concave-convex particle structure;

Preferably, inner surfaces of the thin-walled wall surfaces have:

the anti-adhesion surface micro-marks; and the anti-adhesion surface micro-marks are surface texture and/or a concave-convex particle structure;

where the inner surfaces of the thin-walled wall surfaces are surfaces in communication with the cylindrical temporary storage area.

Preferably, the barrel-shaped thin-walled cone is provided with a spiral guiding arm; and the spiral guiding arm is configured to provide mechanical unbalanced guidance, such that the barrel-shaped thin-walled cone can rotate in a direction of the guiding arm during the compression and nesting process.

Preferably, the spiral guiding arm is one or more of a mechanically weakening recess, and/or a mechanically reinforcing protrusion, and/or wavy texture disposed on a surface of the barrel-shaped thin-walled cone.

Preferably, the sealing surface of the opening sealing portion has a plunger sealing main body and a limiting assembly;

the limiting assembly is disposed on a surface of the plunger sealing main body; and the limiting assembly is one or more of an annular protrusion, an annular groove, a local protrusion, and a local groove.

The present disclosure provides an infant and toddler feeder, which has the following beneficial effects:

when the biting and sucking area is empty or has any gap, the elastic thrust F provided by the pushing connection portion to the piston will always exert the acting force to the food in the cylindrical temporary storage area towards the biting and sucking area, such that the temporarily stored food automatically enters the biting and sucking area, without the need for the infant or his/her parents to manually push the food, and the problem of food accumulation is thus effectively avoided.

Figure 1:
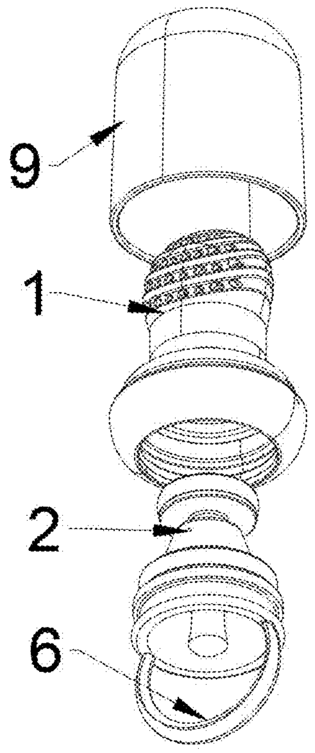
FIG. 1 is an exploded view of an infant and toddler feeder according to the present disclosure.

Reference numerals in the accompanying drawings:

1. first main body; 101. food pouch; 1011. biting and sucking area; 1012. cylindrical temporary storage area; 102. filling opening; 2. second main body; 201. opening sealing portion; 2011. annular outer wall; 2012. annular inner wall; 2013. plunger sealing main body; 2014. limiting assembly; 202. piston; 2021. front piston surface; 2022. back piston surface; 2023. annular piston surface; 203. pushing connection portion; 2031. first end face; 2032. second end face; 301 groove; 302. food outlet; 4. piston push rod; 5. air-permeable through hole; 6. easy-hold handle; 7. anti-adhesion surface micro-mark; 8. spiral guiding arm; and 9. sealing cover.

DETAILED DESCRIPTIONS OF THE EMBODIMENTS

The technical solutions of embodiments of the present disclosure will be described below clearly and comprehensively in conjunction with accompanying drawings of the embodiments of the present disclosure. Apparently, the embodiments described are merely some embodiments rather than all embodiments of the present disclosure. All the other embodiments obtained by those of ordinary skill in the art based on the embodiments in the present disclosure without creative efforts shall fall within the scope of protection of the present disclosure.

Figure 2:
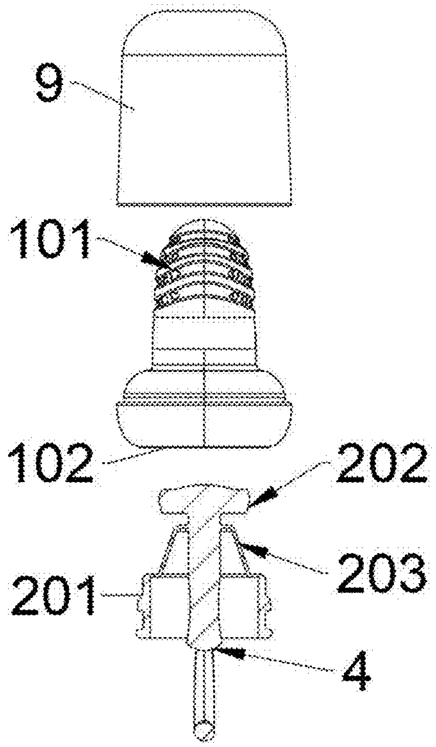
FIG. 2 is a side view of an infant and toddler feeder according to the present disclosure.
Figure 3:
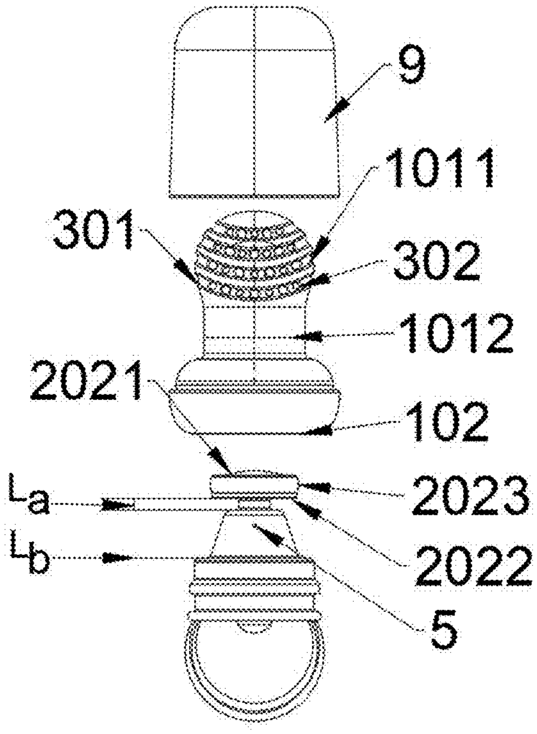
FIG. 3 is a front view of an infant and toddler feeder according to the present disclosure.
Figure 4:
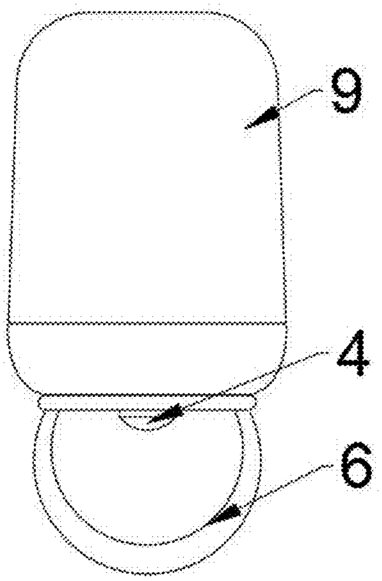
FIG. 4 is a schematic diagram for assembly of an infant and toddler feeder according to the present disclosure.
Figure 5:
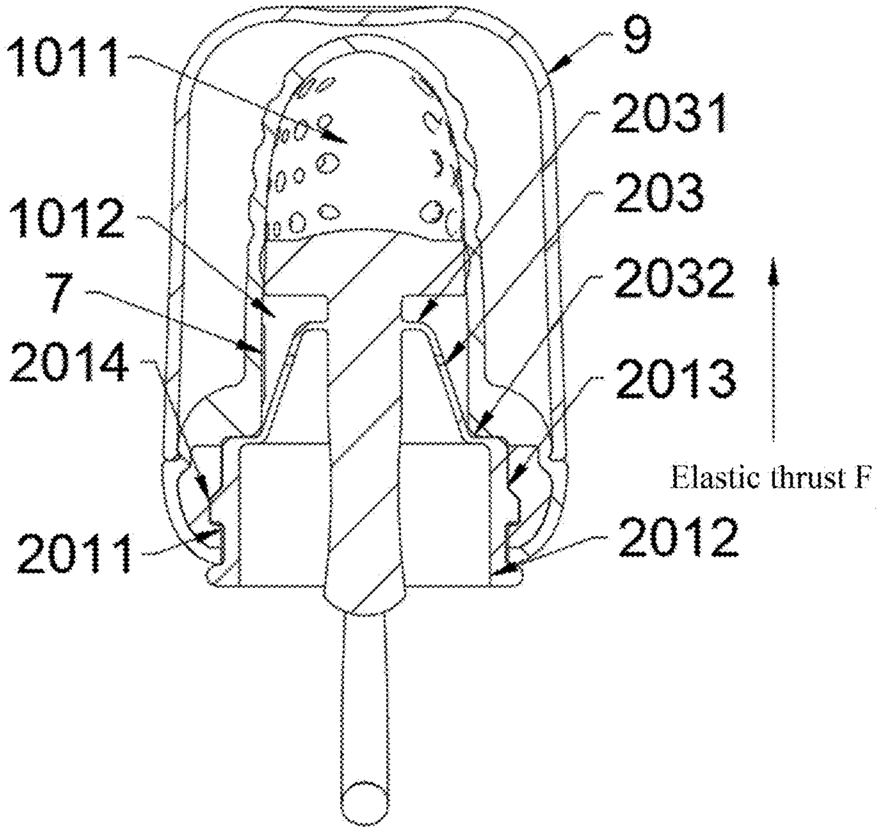
FIG. 5 is a cross-sectional view of FIG. 4.
Figure 6:
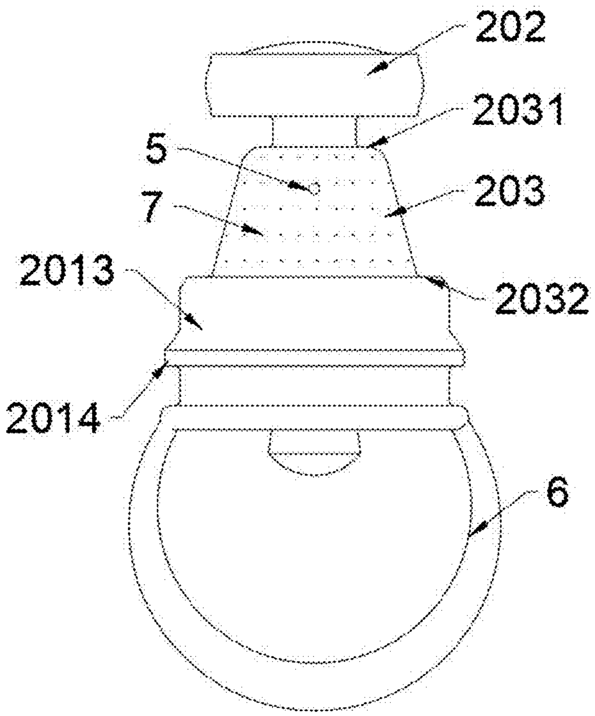
FIG. 6 is a first structural schematic diagram of a second main body of an infant and toddler feeder according to the present disclosure.
Figure 7:
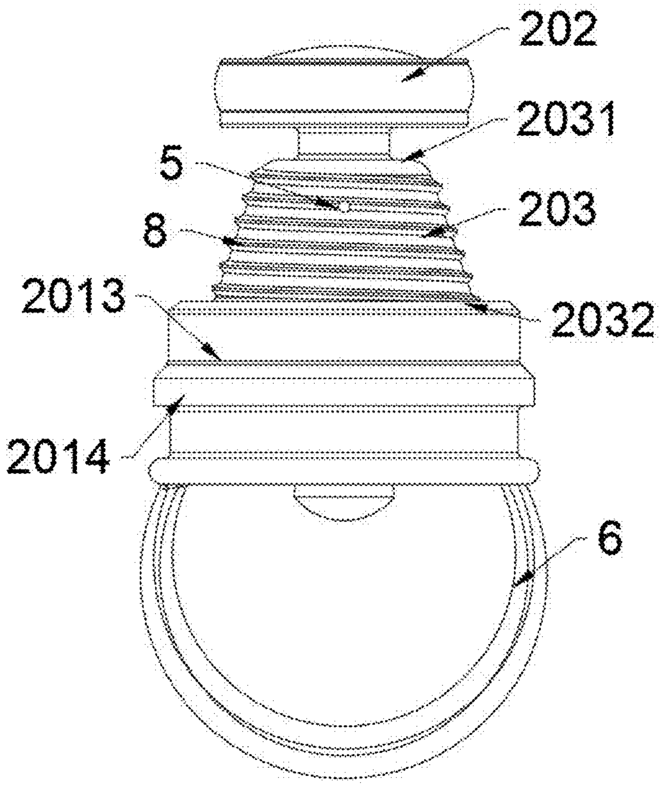
FIG. 7 is a second structural schematic diagram of a second main body of an infant and toddler feeder according to the present disclosure (having a spiral guiding arm).
Figure 8:
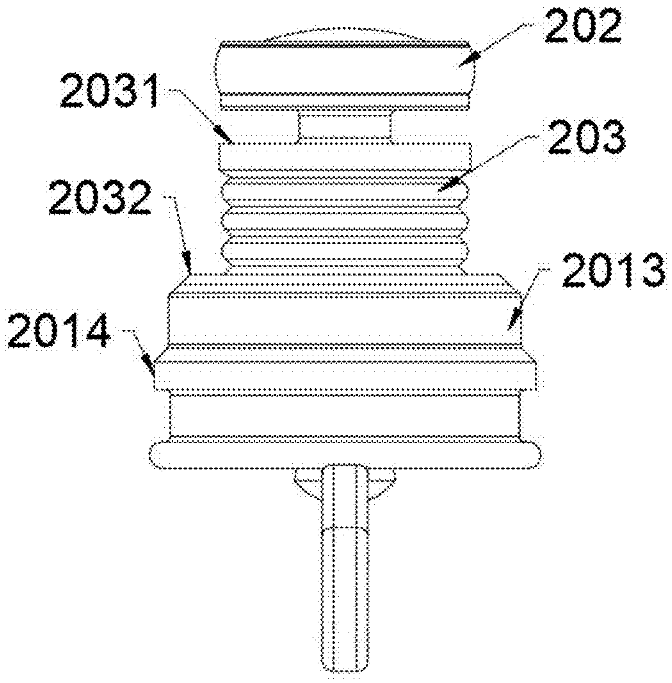
FIG. 8 is a third structural schematic diagram of a second main body of an infant and toddler feeder according to the present disclosure (having a spiral guiding arm).
Figure 9:
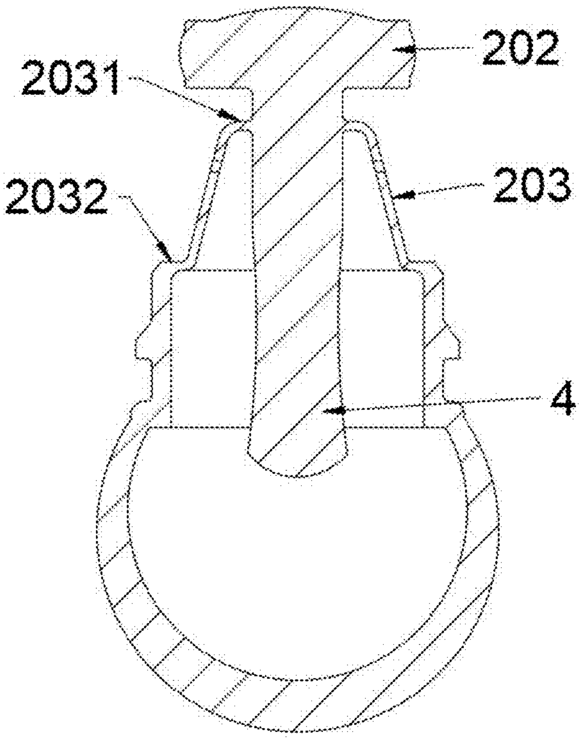
FIG. 9 is a schematic diagram of a piston of an infant and toddler feeder in a first steady-state position according to the present disclosure.
Figure 10:
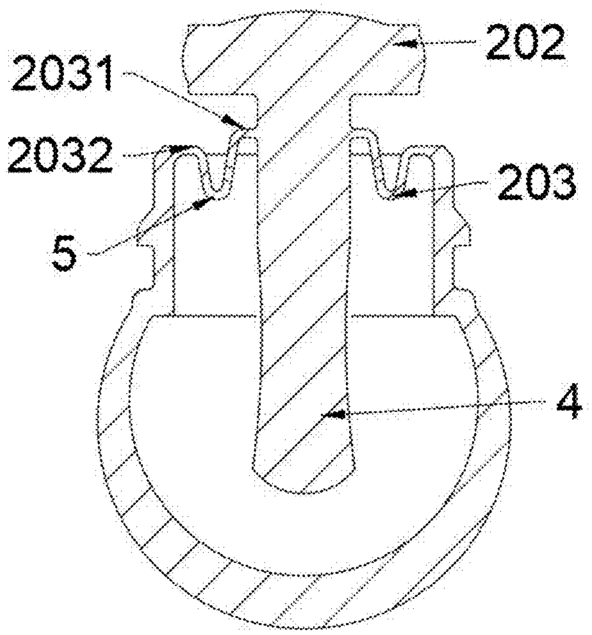
FIG. 10 is a schematic diagram of a piston of an infant and toddler feeder in a critical position according to the present disclosure.
Figure 11:
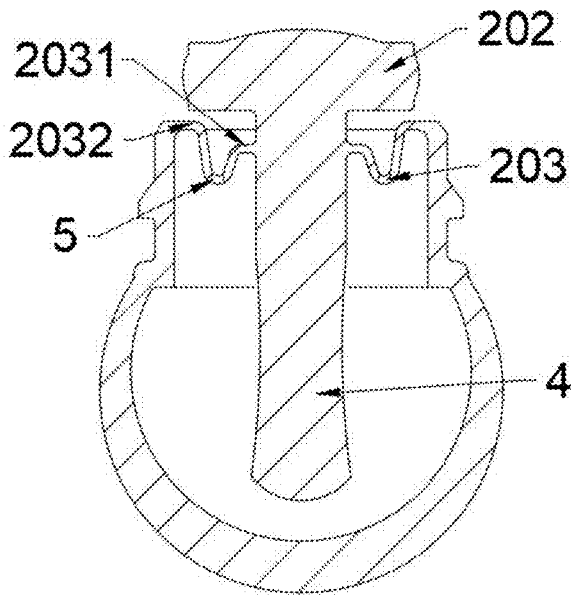
FIG. 11 is a schematic diagram of a piston of an infant and toddler feeder in a second steady-state position according to the present disclosure.

With reference to FIGS. 1-14, specific embodiments provided by the present disclosure are as follows:

as shown in FIGS. 1-3, a first embodiment of the present disclosure provides an infant and toddler feeder, including:

a first main body 1; and a second main body 2;

where the first main body 1 has a food pouch 101 and a filling opening 102;

the food pouch 101 includes a biting and sucking area 1011 and a cylindrical temporary storage area 1012;

the filling opening 102 is disposed at one end of the cylindrical temporary storage area 1012, and the biting and sucking area 1011 is disposed at the other end of the cylindrical temporary storage area 1012;

the second main body 2 has an opening sealing portion 201, a piston 202, and a pushing connection portion 203;

the opening sealing portion 201 is matched with the filling opening 102 for connecting the filling opening 102 and sealing the filling opening 102;

the piston 202 is matched with an inner cavity of the cylindrical temporary storage area 1012 to form a connection structure of the piston 202;

the pushing connection portion 203 is connected between the piston 202 and the opening sealing portion 201; and the pushing connection portion 203 provides elastic thrust F, such that the piston 202 has a movement trend towards the biting and sucking area 1011.

In this embodiment, the food pouch 101 of the first main body 1 is configured to contain food, such as fruit. The filling opening 102 is configured to provide a channel for food to enter the food pouch 101. When in specific use, food is placed into the food pouch 101 through the filling opening 102.

The biting and sucking area 1011 is provided for an infant to chew, and is elastic, for example, made of food-grade silicone. The biting and sucking area is squeezed and deformed due to acting force of chewing, causing the food in the biting and sucking area to be crushed, such that juice and the pulp enters a mouth of the infant through food outlets 302 of the biting and sucking area 1011. Further, the cylindrical temporary storage area 1012 is configured to store part of the food. When the biting and sucking area 1011 is empty, the food in the cylindrical temporary storage area 1012 is squeezed by the pushing connection portion 203 and enters the biting and sucking area 1011 to continue to be chewed and eaten by the infant.

The opening sealing portion 201, the piston 202, and the pushing connection portion 203 of the second main body 2 are integrally formed. The first main body 1 is provided with a detachable sealing cover 9 to ensure hygiene in an unused state.

The opening sealing portion 201 is configured to form a sealing connection with the filling opening 102 of the first main body 1 to prevent the food or juice from flowing out from the end. The pushing connecting portion 203 provides the elastic force F to the piston 202. Specifically, when the biting and sucking area 1011 is empty or has any gap, the elastic thrust F provided by the pushing connection portion 203 to the piston 202 will always exert the acting force to the food in the cylindrical temporary storage area 1012 towards the biting and sucking area 1011, such that the temporarily stored food automatically enters the biting and sucking area 1011, without the need for the infant or his/her parents to manually push the food, and the problem of food accumulation is thus effectively avoided.

In one specific implementation, a plurality of grooves 301 are formed on the biting and sucking area 1011, and the grooves 301 are configured to correspond to chewing positions of teeth or gum of the infant are chewed. A plurality of food outlets 302 are formed on each groove 301, where the food outlets 302 include solid food outlets 302 (for solid food residue or particles to pass through) with a relatively large diameter, and liquid food outlets 302 (for the outflow of food juice) with a relatively small diameter.

In one specific implementation, positions of the food outlets 302 are disposed on a circumferential wall surface of the biting and sucking area 1011, such that the problem of infant chocking due to the juice or food residue being directly squeezed and splashed into an esophagus of the infant is avoided.

In one specific implementation, the grooves 301 and the food outlets 302 closest to the cylindrical temporary storage area 1012 are disposed in a staggered manner, that is, a distance between the food outlets 302 and the cylindrical temporary storage area 1012 is greater than a distance between the groove 301 and the cylindrical temporary storage area 1012, the reason is that, the infant usually does not bite the groove 301 farthest from the mouth of the infant, which will be squeezed and deformed by deformation of the biting and sucking area 1011, causing the juice or food residue to flow out from the food outlets 302 thereat, and will not enter the mouth of the infant, finally causing the food residue or juice to flow down along corners of the mouth of the infant or directly drip on garment or body of the infant. When the food outlets 302 at the position are relatively close to the mouth of the infant, the problem that the food residue or juice cannot flow into the mouth of the infant can be effectively avoided.

In addition, this form can facilitate more thorough delivery of the food, the reason is that when all the food outlets 302 are completely held by the infant in his/her mouth, the biting and sucking area 1011 will be in a negative pressure state due to sucking action of the infant when he/she sucks the food, making the food difficult to be sucked into the mouth of the infant. Therefore, when the food outlets 302 are at a certain distance from the mouth of the infant, the food outlets can be used as a communication structure between the biting and sucking area 1011 and an external environment, so as to avoid the problem that the biting and sucking area 1011 produce a relatively great negative pressure to affect food sucking by the infant.

Preferably, a difference between the distance between the food outlets 302 and the cylindrical temporary storage area 1012 and the distance between the groove 301 and the cylindrical temporary storage area 1012 ranges from 3 mm to 5 mm.

As shown in FIGS. 1-5, a second embodiment of the present disclosure provides an infant and toddler feeder, and on the basis of the first embodiment, the pushing connection portion 203 is a barrel-shaped thin-walled cone having a first end face 2031 and a second end face 2032;

where the barrel-shaped thin-walled cone is elastic;

the first end face 2031 is connected to the piston 202;

the second end face 2032 is connected to the opening sealing portion 201;

an area of the first end face 2031 is smaller than that of the second end face 2032; and when the first end face 2031 moves towards the second end face 2032 under the action of external force, the barrel-shaped thin-walled cone can elastically deform and form a nested structure.

In this embodiment, the elastic thrust F is provided by the barrel-shaped thin-walled cone.

Specifically, the first end face 2031 and the second end face 2032 of the barrel-shaped thin-walled cone are respectively connected to the piston 202 and the opening sealing portion 201. The above form has the advantages that: the barrel-shaped thin-walled cone provides the elastic thrust F in the form of elastic deformation. In a specific use scenario, after the food pouch 101 is filled with the food, it is expected that the piston 202 can always provide the elastic thrust F to the food, so as to ensure that the food in the cylindrical temporary storage region 1012 can be continuously pushed to the biting and sucking area 1011, and further, the elastic thrust F is relatively flexible and not a mandatory rigid acting force to ensure that the food can be sent out towards the mouth of the infant, and can also be retracted back by extrusion force, without causing damage to deciduous teeth or gum of the infant.

Further, the barrel-shaped thin-walled cone may elastically deform to form the nested structure. Specifically, when the second main body 2 is assembled to the first main body 1, the food is first placed into the food pouch 101, the piston 202 is compressed, a circumferential wall surface of the barrel-shaped thin-walled cone is folded to form an elastic deformation, and the barrel-shaped thin-walled cone shows a trend to return to an initial state, such that the elastic thrust F is generated for push the food.

It is foreseeable that the food pushing process does not require manual intervention by the infant or his/her parents, and the elastic thrust F is flexible, which can ensure that the food can be retracted to some extent on the basis of a certain thrust, thereby effectively protecting the deciduous teeth or gum of the infant.

As shown in FIGS. 1-5, a third embodiment of the present disclosure provides an infant and toddler feeder, and on the basis of the previous embodiment, the opening sealing portion 201 is an annular structure having an annular outer wall 2011 and an annular inner wall 2012;

where the annular outer wall 2011 is in interference connection with an inner wall surface of the filling opening 102; and the second end face 2032 is connected to the annular inner wall 2012 of the opening sealing portion 201.

In this embodiment, the annular outer wall 2011 of the opening sealing portion 201 forms an interference fit with the inner wall surface of the filling opening 102 to achieve a sealing connection between the them, and to ensure sealing performance.

On the basis of the above, it is further found that when the opening sealing portion 201 is provided as a solid structure, the sealing performance can be ensured, but the effect is excessive. Specifically, it is difficult to disassemble the first main body 1 and the second main body 2 in the structural form, since the opening sealing portion 201 is of a solid structure, when the acting force in a radial direction of the opening sealing portion is exerted on the same, it is difficult to have the opening sealing portion 201 of the solid structure compressed and deformed, thus, only acting force in an axial direction can be exerted on the second main body 2 to be pulled out of the first main body 1.

Further, users of the products are usually parents of the infants. Unlike other products (such as electronic products), the products usually do not provide instructions for use, therefore, the users disassemble the first main body 1 and the second main body 2 totally depending on experience or common general knowledge of the users. However, the problem that the first main body 1 and the second main body 2 are difficult to be disassembled revealed in the above process is very common, significantly reducing the experience feeling of the products.

Therefore, the opening sealing portion 201 in this embodiment further has the annular inner wall 2012. Specifically, the opening sealing portion 201 does not show a solid structure any longer through the annular inner wall 2012, that is, the annular inner wall 2012 encloses a deformation cavity; when the user wants to disassemble the second main body 2 and the first main body 1, he/she only needs to exert smaller acting force on the opening sealing portion 201, such that the deformation cavity will deform, and a notch occurs in a tight contact state between the annular outer wall 2011 and the inner wall surface of the filling opening 102, facilitating smooth disassembly of the first main body 1 from the second main body 2.

Even though the instructions for use are not provided for the user regarding the above process, during limited use process or accidentally, the user will discover that the first main body 1 and the second main body 2 can be easily and quickly disassembled.

It is foreseeable that this embodiment is equivalent to causing the deformation cavity to occupy a space of the solid structure of the opening sealing portion 201, such that a function of quick disassembly of the first main body 1 from the second main body 2 is achieved.

On the basis of the above, a diameter of a lower end face of the opening sealing portion 201 is greater than a diameter of the filling opening 102. The reason is that, since the diameter of the lower end face of the opening sealing portion 201 is greater, when the user exerts acting force on the opening sealing portion in the radial direction, the stability of the opening sealing portion 201 at the filling opening 102 will be increased, and meanwhile, the user can grasp and operate the feeder better. Due to the size difference, when the user exerts the acting force on the opening sealing portion 201 in the radial direction, a controllable tiny notch will be formed between the annular outer wall 2011 of the opening sealing portion 201 and the inner wall surface of the filling opening 102. The notch not only reduces the force required for disassembly, but also allows the opening sealing portion 201 to deform and move more easily, facilitating quick and smooth disassembly of the first main body 1 and the second main body 2.

A fourth embodiment of the present disclosure provides an infant and toddler feeder, and on the basis of the previous embodiment, the feeder includes:

a piston push rod 4;

where the piston 202 has a front piston surface 2021, a back piston surface 2022 and an annular piston surface 2023;

the front piston surface 2021 faces the biting and sucking area 1011;

the back piston surface 2022 is the other end face of the piston 202 parallel to the front piston surface 2021;

the annular piston surface 2023 is a surface that form a position connection with an inner wall of the cylindrical temporary storage area; and the piston push rod 4 is disposed on the back piston surface 2022 and extends in an opposite direction of the elastic thrust F.

In this embodiment, the front piston surface 2021 is an end face in contact with the food, the annular piston surface 2023 is an end face sealed with an inner wall surface of the cylindrical temporary storage area 1012, and the back piston surface 2022 is an end face connected to the piston push rod 4.

It is found in the above embodiment that when the food is filled, and the first main body 1 and the second main body 2 are sealed and assembled, external force needs to be manually exerted on to the piston 202, such that the piston 202 retreats a certain distance. Further, since the front piston surface 2021 is the end face in contact with the food, when a finger (or other parts or structures, such as chopsticks) is in contact with the front piston surface and exerts external force thereon, the front piston surface 2021 (and the annular piston surface 2023) will be inevitably contaminated, thereby resulting in food contamination.

On this basis, the piston push rod 4 is introduced. The piston push rod 4 extends in the opposite direction of the elastic thrust F, that is to say, the piston push rod 4 is separated from the food pouch 101 and is exposed to an external environment. When external force needs to be exerted on the piston 202, the piston 202 can be pulled to displace in in the opposite direction of the elastic thrust F by pulling the piston push rod 4 in the same direction, that is, the front piston surface 2021 will not be contacted throughout the process, thereby effectively avoiding contamination of the position and ensuring food hygiene of the infant.

Further, as described above, when the user sees the piston push rod 4 on the premise that no instructions for use are provided, it is not required for the user to know the function of the piston push rod 4, to ensure simple operation of the products.

As shown in FIGS. 1-3, a fifth embodiment of the present disclosure provides an infant and toddler feeder, and on the basis of the previous embodiment, the first end face 2031 is connected to a position A of the piston push rod 4;

the second end face 2032 is connected to a position B of the opening sealing portion 201;

where a distance from the position A to the back piston surface 2022 is $L_a$;

a distance from the position B to an upper end face of the opening sealing portion 201 is $L_b$; and the upper end face of the opening sealing portion 201 is an end face of the opening sealing portion 201 facing the biting and sucking area 1011.

Preferably, $L_b + m < L_a$, $2\text{ mm} \le m \le 10\text{ mm}$.

In this embodiment, the piston 202 cooperates with the piston push rod 4 to have three states as follows:

first, the first end face 2031 is higher than the second end face 2032, specifically, the first end face 2031 is closer to the biting and sucking area 1011 than the second end face 2032 in the direction of the elastic thrust F, in which case, the piston 202 is significantly affected by the elastic force of the barrel-shaped thin-walled cone and displaces towards the biting and sucking area 1011 until the elastic thrust F is completely released, and the first end face 2031 and the second end face 2032 are at a maximum distance, that is, a first steady-state position (which is temporary and can be subjected to external force to transition from the first steady-state position to a critical position (as stated below) from the first steady-state position);

second, when the piston push rod 4 pulls the piston 202 to displace in the opposite direction of the elastic thrust F, the circumferential wall surface of the barrel-shaped thin-walled cone is folded and deformed, and the first end face 2031 moves towards the second end face 2032 until the first end face 2031 and the second end face 2032 are on the same plane, that is, the critical position (the position that is subjected to external force is transitioned to the first steady-state position or a second steady-state position as stated below); and third, when the piston push rod 4 continues to pull the piston 202 to displace in the opposite direction of the elastic thrust F, the circumferential wall surface of the barrel-shaped thin-walled cone continues to be folded and deformed, and the first end face 2031 is lower than the second end face 2032, specifically, the second end face 2032 is closer to the biting and sucking area 1011 than the first end face 2031 in the direction of the elastic thrust F, in which case, the elastic thrust F of the barrel-shaped thin-walled cone on the piston 202 is opposite to an initial direction thereof until the circumferential wall surface of the barrel-shaped thin-walled cone is completely folded, and in which case, the first end face 2031 and the second end face 2032 do not undergo any displacement any longer, that is, the second steady-state position (which is temporary and can be subjected to external force to transition to the above-mentioned critical position).

Specifically, when it is transitioned from the critical position to the first steady-state position, the elastic thrust F is directed towards the biting and sucking area 1011, and in which case, the feeder exerts a pushing effect on the food. When it is transitioned from the critical position to the second steady-state position, the elastic thrust F is opposite to the above-mentioned direction, and the piston 202 is also displaced in the direction.

Based on the above finding, it is relatively important to have the piston 202 at different equilibrium positions by exerting thrust force (acting force transitioning from the critical position to the first steady-state position) on the piston 202 or exerting pulling force on the piston 202 (acting force transitioning from the critical position to the second steady-state position) in the critical position through the piston push rod 4. The reason is that after the food filling is completed, when the second main body 2 and the first main body 1 are assembled, it is expected that the piston 202 is at the second steady-state position, such that the food or juice cannot be flowed out from the feeder the piston 202 squeezes and pushes the food when the second main body 2 is assembled to the first main body 1. After the assembly of the second main body 2 and the first main body 1 is completed, it is expected that the piston 202 can be transitioned to the first steady-state position to continuously squeeze and push the food.

On this basis, it is defined that $L_b$+m<$L_a$, 2 mm<m≤10 mm. Preferably, 4 mm≤m≤7 mm.

Specifically, the reason for defining $L_b$+m<$L_a$ is to ensure that the piston 202 can transition from the critical position to the second steady-state position, that is to say, the barrel-shaped thin-walled cone is prevented from exerting the elastic thrust F only on the piston 202 towards the biting and sucking area 1011. Specifically, when a value of $L_a$ is very smaller, it means that the first end face 2031 is infinitely close to the back piston surface 2022, that is, when the piston 202 moves to the critical position, the first end face 2031 and the second end face 2032 are on the same plane, that is, the back piston surface 2022 and the second end face 2032 are on the same plane, the annular piston surface 2023 will contact and get stuck with the upper end face of the opening sealing portion 201, such that the first end face 2031, that is, the back piston surface 2022 cannot continue to move towards the second steady-state position, the function of the second steady-state position fails, that is, the barrel-shaped thin-walled cone always exerts the elastic thrust F on the piston 202 towards the biting and sucking area 1011, resulting in the above-mentioned hygiene problem. Therefore, by defining the above correlation relationship, the piston 202 has the second steady-state position, such that the piston 202 can move to the second steady-state position through the piston push rod 4 when the second main body 2 and the first main body 1 are assembled, that is, the problem of the pollution of the front piston surface 2021 and the problem of squeezing the food by the piston 202 during the assembly will be avoided.

On the basis of the above, the magnitude of the acting force when the piston 202 transitions from the critical position to the first steady-state position is considered. What is expected in this embodiment is that the acting force is relatively small, such that the infant, in case of a false touch, can also push the piston 202 from the critical position to the first steady-state position.

On this basis, it is further defined that 0 mm≤$L_b$≤3 mm, and preferably, 0 mm it taken, where m represents a false touch threshold for transition to the second steady-state position, that is, the second end face 2032 and the upper end face of the opening sealing portion 201 are on the same horizontal plane. The above form has the advantages that: the acting force exerted on the piston 202 when it transitions from the critical position to the first steady-state position is relatively small, specifically, the piston 202 can be pushed and transitioned to the second steady-state position by small hand force of the infant due to slightly false touch of the piston push rod 4 by the infant.

As shown in FIGS. 5-11, a sixth embodiment of the present disclosure provides an infant and toddler feeder, and on the basis of the previous embodiment, thin-walled wall surfaces of the bucket-type thin-walled cone is a continuous surface; and when the first end face 2031 and the second end face 2032 are in a close state without the action of external force, air-permeable through holes 5 are formed at a crease produced by nesting of the barrel-shaped thin-walled cone, and the air-permeable through holes 5 penetrate through the thin-walled wall surfaces.

In this embodiment, it is further found that when the thin-walled wall surfaces of the barrel-shaped thin-walled cone are in a folded state, adhesion between thin-walled wall surfaces is easily formed. The specific reason is that the user is accustomed to washing the feeder before using it, and using the feeder immediately after washing, without waiting for drying of the feeder. Therefore, a certain amount of water exists on the thin-walled wall surfaces, and forms a local sealing when the thin-walled wall surfaces are folded; and the adhesion between the thin-walled wall surfaces will be significantly increased due to intermolecular force of the water after the thin-walled wall surfaces are folded, making the piston 202 in the second steady-state position difficult to transition to the critical position and the first steady-state position (because a wall surface of the thin-walled wall surfaces is difficult to unfold).

On this basis, the air-permeable through holes 5 are formed at the crease. The air-permeable through holes 5 are configured to break the above local seal, so as to significantly reduce the adhesion between the thin-walled wall surfaces in the folded state, thereby ensuring that the thin-walled wall surfaces can be easily unfolded.

On the basis of the above, the air-permeable through holes 5 can be uniformly arranged, and a plurality of the air-permeable through holes can be arranged. The reason is that, uniform arrangement of the air-permeable through holes can ensure uniform break of local sealing of the folded thin-walled wall surfaces, instead of arranging the air-permeable through holes 5 in a certain area, so as to avoid the problem that the remaining area of the folded thin-walled wall surfaces is difficult to be unfolded.

A seventh embodiment of the present disclosure provides an infant and toddler feeder, and on the basis of the previous embodiment, the feeder includes an easy-hold handle 6;

the easy-hold handle 6 is disposed on a lower end face of the opening sealing portion 201; and the lower end face is another end face of the opening sealing portion 201 parallel to the upper end face thereof.

Figure 12:
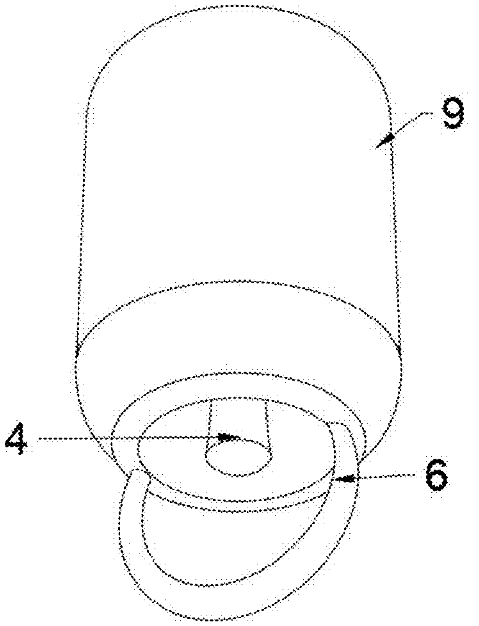
FIG. 12 is a structural schematic diagram of a ring-shaped easy-hold handle of an infant and toddler feeder according to the present disclosure.
Figure 13:
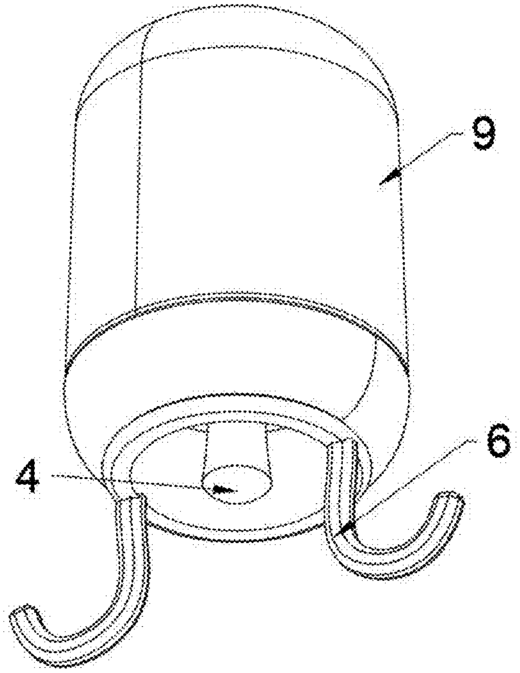
FIG. 13 is a structural schematic diagram of a double crank-shaped easy-hold handle of an infant and toddler feeder according to the present disclosure.
Figure 14:
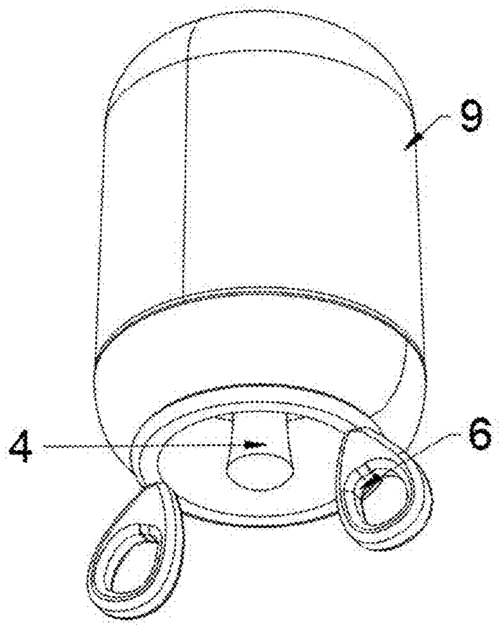
FIG. 14 is a structural schematic diagram of a double ring-shaped easy-hold handle of an infant and toddler feeder according to the present disclosure.

As shown in FIGS. 12-14, in this embodiment, the easy-hold handle 6 is convenient for the infant to grip. The easy-hold handle 6 can be a single ring shape, a double ring shape, a double crank shape, a tail shape, and the like.

An eighth embodiment of the present disclosure provides an infant and toddler feeder, and on the basis of the previous embodiment, one or more of inner cavity surfaces of the annular piston surface 2023 and/or the cylindrical temporary storage area 1012, a sealing surface of the opening sealing portion 201, and/or an inner cavity surface of the filling opening 102 have:

anti-adhesion surface micro-marks 7; and the anti-adhesion surface micro-marks 7 are surface texture and/or a concave-convex particle structure.

inner surfaces of the thin-walled wall surfaces have:

the anti-adhesion surface micro-marks 7; and the anti-adhesion surface micro-marks 7 are surface texture and/or a concave-convex particle structure;

where the inner surfaces of the thin-walled wall surfaces are surfaces in communication with the cylindrical temporary storage area 1012.

In this embodiment, it is further found that the surface of the feeder is very smooth due to the use of food-grade silicone, local vacuum is easily produced when two smooth wall surfaces come into contact, resulting in a strong sense of retardation and blocking force, which in turn leads to:

first, sliding between the annular piston surface 2023 and the cylindrical temporary storage area is easily stuck, making it difficult to form a good pushing effect on the food;

second, the adhesion effect of the thin-walled wall surfaces in the folded state is significantly improved, making it extremely difficult to unfold.

On this basis, by arranging the anti-adhesion surface micro-marks 7 in the above structure, the possibility of vacuum production can be effectively reduced, and damping between the structures can be slowed down, thereby ensuring the smoothness of food pushing and expansion of the thin-walled wall surfaces.

Specifically, the anti-adhesion surface micro-marks 7 can be made by sandblasting or etching techniques.

A ninth embodiment of the present disclosure provides an infant and toddler feeder, and on the basis of the previous embodiment, the barrel-shaped thin-walled cone is provided with a spiral guiding arm 8; and the spiral guiding arm 8 is configured to provide mechanical unbalanced guidance, such that the barrel-shaped thin-walled cone can rotate in a direction of the guiding arm during the compression and nesting process.

In this embodiment, it is further found that when the thin-walled wall surfaces are folded, the folded state of the thin-walled wall surfaces are uneven, specifically, the thin-walled wall surfaces of a certain area is folded, while the remaining thin-walled wall surfaces are not folded, which makes the piston 202 radially tilted when the piston transitions to the first steady-state position and the second steady-state position, and greater force is required to overcome the uneven elastic deformation.

On this basis, the thin-walled wall surfaces are provided with the spiral guiding arm 8 with an objective of avoiding too large or small local folding by enabling the thin-walled wall surfaces to be regularly and elastically folded according to a forming path thereof through the spiral guiding arm 8, such that the folded state of the barrel-shaped thin-walled cone is balanced elastic deformation, thereby ensuring that the elastic thrust F exerted on the piston 202 is also balanced (that is, providing the piston 202 with relatively uniform acting force in the axial direction).

The spiral guiding arm 8 is one or more of a mechanically weakening recess, and/or a mechanically reinforcing protrusion, and/or wavy texture disposed on a surface of the barrel-shaped thin-walled cone.

A tenth embodiment of the present disclosure provides an infant feeder, and on the basis of the previous embodiment, the sealing surface of the opening sealing portion 201 has a plunger sealing main body 2013 and a limiting assembly 2014;

the limiting assembly 2014 is disposed on a surface of the plunger sealing main body 2013; and the limiting assembly 2014 is one or more of an annular protrusion, an annular groove, a local protrusion, and a local groove.

In the above embodiment, it is further found that the present disclosure expects that acting force exerted in the axial direction of the first main body 1 is at least relatively greater (at least difficult for the infant to implement), to prevent the infant from directly pulling the second main body 2 out from the first main body 1.

Therefore, the plunger sealing main body 2013 and the limiting assembly 2014 are introduced.

The plunger sealing main body 2013 is configured to form a seal with the filling opening 102.

The limiting assembly 2014 is at least configured to provide limiting force for the first main body 1 and the second main body 2 in an axial direction, so as to prevent the first main body and the second main body from being separated by exerting relatively smaller force.

Further, as described above, the disassembly of the first main body 1 and the second main body 2 in the present disclosure is implemented by exerting the acting force in a radial force, rather than in the axial direction. Therefore, the foregoing arrangement can effectively avoid the problem of false pulling by the infant.

In the description of the embodiments of the present disclosure, it should be understood that the terms "upper", "lower", "front", "back", "left", "right", "vertical", "horizontal", "central", "top", "bottom", "top surface", "bottom surface", "inner", "outer", "inside", "outside" and other indicated orientations or positional relationships are based on orientation or position relations shown in the accompanying drawings.

In the description of the embodiments of the present disclosure, it should be noted that, unless otherwise explicitly specified and defined, the terms "mounting", "connecting", "connection" and "assembly" should be understood in a broad sense, for example, they may be a fixed connection, a detachable connection, or an integrated connection; and may be a direct connection, or an indirect connection via an intermediate medium, or communication inside two elements. For those of ordinarily skilled in the art, specific meanings of the above terms in the present disclosure could be understood according to specific circumstances.

In the description of the embodiments of the present disclosure, specific feature, structure, material or characteristics described may be combined in a suitable manner in any one or more embodiments or examples.

In the description of the embodiments of the present disclosure, the term "and/or" represents merely an association relationship describing associated objects, indicating that there may be three types of relationships, for example, A and/or B, which means three types of situation, that is, the existence of A alone, the existence of both A and B, and the existence of B alone. In addition, the character "/" herein generally indicates that the associated objects are in an "or" relationship.

Although the embodiments of the present disclosure have been illustrated and described, it should be understood that those of ordinary skill in the art may make various changes, modifications, replacements and variations to the above embodiments without departing from the principle and spirit of the present disclosure, and the scope of the present disclosure is limited by the appended claims and their legal equivalents.

What is claimed is:

1. An infant and toddler feeder, comprising:
a first main body; and
a second main body; wherein
the first main body has a food pouch and a filling opening;
the food pouch comprises a biting and sucking area and a cylindrical temporary storage area;
the filling opening is disposed at one end of the cylindrical temporary storage area, and the biting and sucking area is disposed at the other end of the cylindrical temporary storage area;
the second main body has an opening sealing portion, a piston, and a pushing connection portion;
the opening sealing portion is matched with the filling opening for connecting the filling opening and sealing the filling opening;
the piston is matched with an inner cavity of the cylindrical temporary storage area to form a connection structure of the piston;
the pushing connection portion is connected between the piston and the opening sealing portion;
the pushing connection portion provides elastic thrust F, such that the piston has a movement trend towards the biting and sucking area;
the pushing connection portion is a barrel-shaped thin-walled cone having a first end face and a second end face,
the barrel-shaped thin-walled cone is elastic;
the first end face is connected to the piston;
the second end face is connected to the opening sealing portion;
an area of the first end face is smaller than an area of the second end face; and
when the first end face moves towards the second end face under the action of external force, the barrel-shaped thin-walled cone can elastically deform and form a nested structure.

2. The infant and toddler feeder according to claim 1, wherein
the opening sealing portion is an annular structure having an annular outer wall and an annular inner wall;
the annular outer wall is in interference connection with an inner wall surface of the filling opening; and
the second end face is connected to the annular inner wall of the opening sealing portion.

3. The infant and toddler feeder according to claim 2, comprising:
an easy-hold handle;
the easy-hold handle is disposed on a lower end face of the opening sealing portion; and
the lower end face of the opening sealing portion is another end face of the opening sealing portion parallel to an upper end face thereof.

4. The infant and toddler feeder according to claim 1, comprising:

a piston push rod; wherein the piston has a front piston surface, a back piston surface and an annular piston surface;

the front piston surface faces the biting and sucking area;

the back piston surface is the other end face of the piston parallel to the front piston surface;

the annular piston surface is connected to an inner wall of the cylindrical temporary storage area to form a surface connecting with the piston; and the piston push rod is disposed on the back piston surface and extends in an opposite direction of the elastic thrust F.

5. The infant and toddler feeder according to claim 4, wherein the first end face is connected to a position A of the piston push rod;

the second end face is connected to a position B of the opening sealing portion;

a distance from the position A to the back piston surface is La;

a distance from the position B to an upper end face of the opening sealing portion is Lb;

the upper end face of the opening sealing portion is an end face of the opening sealing portion facing the biting and sucking area; and $Lb+m<La$, and $2\text{ mm} \leq m \leq 10\text{ mm}$.

6. The infant and toddler feeder according to claim 5, wherein $0\text{ mm} \leq Lb \leq 3\text{ mm}$.

7. The infant and toddler feeder according to claim 5, wherein thin-walled wall surfaces of the barrel-shaped thin-walled cone are continuous surfaces; and when the first end face and the second end face are in a close state, air-permeable through holes are formed at a crease produced by nesting of the barrel-shaped thin-walled cone, and the air-permeable through holes penetrate through the thin-walled wall surfaces.

8. The infant and toddler feeder according to claim 7, wherein n air-permeable through holes are evenly distributed on a circumference of the crease;

and $2 \leq n \leq 4$.

9. The infant and toddler feeder according to claim 7, wherein inner surfaces of the thin-walled wall surfaces further comprise:

anti-adhesion surface micro-marks;

the anti-adhesion surface micro-marks are surface texture and/or a concave-convex particle structure; and the inner surfaces of the thin-walled wall surfaces are surfaces in communication with the cylindrical temporary storage area.

10. The infant and toddler feeder according to claim 4, wherein one or more of inner cavity surfaces of the annular piston surface and/or the cylindrical temporary storage area, a sealing surface of the opening sealing portion, and/or an inner cavity surface of the filling opening further comprise:

anti-adhesion surface micro-marks; and the anti-adhesion surface micro-marks are surface texture and/or a concave-convex particle structure.

11. The infant and toddler feeder according to claim 1, wherein the barrel-shaped thin-walled cone is provided with a spiral guiding arm; and the spiral guiding arm is configured to provide mechanical unbalanced guidance, such that the barrel-shaped thin-walled cone can rotate in a direction of the guiding arm during a compression and nesting process.

12. The infant and toddler feeder according to claim 11, wherein the spiral guiding arm is one or more of a mechanically weakening recess, and/or a mechanically reinforcing protrusion, and/or wavy texture disposed on a surface of the barrel-shaped thin-walled cone.

13. The infant and toddler feeder according to claim 1, wherein a sealing surface of the opening sealing portion has a plunger sealing main body and a limiting assembly;

the limiting assembly is disposed on a surface of the plunger sealing main body; and the limiting assembly is one or more of an annular protrusion, an annular groove, a local protrusion, and a local groove.

* * * * *